United States Patent
Ha Thuc

(10) Patent No.: US 10,633,522 B1
(45) Date of Patent: Apr. 28, 2020

(54) RENEWABLE RESIN COMPOSITION AND PRODUCT PREPARED FROM THE SAME

(71) Applicants: GREEN WHALE global Co., Ltd., Seoul (KR); Nhan Chi Ha Thuc, Ho Chi Minh (VN)

(72) Inventor: Nhan Chi Ha Thuc, Ho Chi Minh (VN)

(73) Assignees: GREEN WHALE global Co., Ltd., Seoul (KR); Nhan Chi HA THUC, Ho Chi Minh (VN)

( * ) Notice: Subject to any disclaimer, the term of this patent is extended or adjusted under 35 U.S.C. 154(b) by 0 days.

(21) Appl. No.: 16/688,393

(22) Filed: Nov. 19, 2019

(30) Foreign Application Priority Data

Oct. 21, 2019 (KR) .................. 10-2019-0130936

(51) Int. Cl.
*C08L 3/02* (2006.01)
*C08L 67/02* (2006.01)
*C08G 63/183* (2006.01)
*C08K 5/00* (2006.01)
*C08K 5/053* (2006.01)

(52) U.S. Cl.
CPC .............. *C08L 3/02* (2013.01); *C08G 63/183* (2013.01); *C08K 5/0016* (2013.01); *C08K 5/053* (2013.01); *C08L 67/02* (2013.01); *C08G 2390/00* (2013.01); *C08L 2201/06* (2013.01); *C08L 2203/16* (2013.01); *C08L 2205/03* (2013.01)

(58) Field of Classification Search
CPC ........ C08L 3/02; C08L 67/02; C08L 2205/03; C08L 2201/06; C08L 2203/16; C08G 63/183; C08G 2390/00; C08K 5/0016; C08K 5/053
See application file for complete search history.

(56) References Cited

FOREIGN PATENT DOCUMENTS

| | | |
|---|---|---|
| JP | 2009-167370 A | 7/2009 |
| JP | 2014-125611 A | 7/2014 |
| KR | 10-2004-0076149 A | 8/2004 |
| KR | 10-2005-0044787 A | 5/2005 |
| KR | 10-1467025 B1 | 12/2014 |
| KR | 10-2018-0042004 A | 4/2018 |

*Primary Examiner* — Michael C Miggins
(74) *Attorney, Agent, or Firm* — Studebaker & Brackett PC

(57) ABSTRACT

Disclosed are a renewable resin composition including 100 parts by weight of cassava starch, 100 to 200 parts by weight of polybutylene succinate (PBS), 20 to 120 parts by weight of polybutylene adipate-co-terephthalate (PBAT), and 10 to 40 parts by weight of a plasticizer, and a product prepared from the same.

8 Claims, No Drawings

RENEWABLE RESIN COMPOSITION AND PRODUCT PREPARED FROM THE SAME

CROSS-REFERENCE TO RELATED APPLICATIONS

This application claims priority to and the benefit of Korean Patent Application No. 10-2019-0130936 filed in the Korean Intellectual Property Office on Oct. 21, 2019 the entire contents of which are incorporated herein by reference.

TECHNICAL FIELD

The present invention relates to a renewable resin composition and a product prepared from the same, and more particularly, to a renewable resin composition which is biodegradable and simultaneously excellent in renewability through reprocessing, and a product prepared from the same.

BACKGROUND ART

Since first developed as an alternative for ivory billiard balls in 1868 by John W. Hyatt from the U.S., plastic, which was a 'God's gift', has actually become a global nightmare that threatens the ecological balance of earth in the last 150 years. It takes about 450 years for one plastic bottle to break down, and the overall recycling rate thereof is only 9%.

While global environmental pollution caused by these plastics has become currently apparent, there is a need for research and development of a treatment to solve environmental pollution problems or a new material which can be subjected to such a treatment.

A treatment method of reducing environmental pollution problems caused by waste plastics in the related art was, for example, a method of decomposing waste plastics into low molecules by pyrolysis or chemical decomposition and incinerating or burying the low molecules. However, the incineration treatment is accompanied by release of carbon dioxide, and thus may be responsible for global warming, and the case where halogen or sulfur and nitrogen elements are included in plastics may also be responsible for air pollution caused by hazardous gases. When plastics are buried in landfills, most of the resins currently put to practical use are in the residual state for a long period of time. During this period, additives flow out, which is one of the causes of soil pollution.

For these problems, the development of a biodegradable polymer has been actively conducted as a polymer compound which does not adversely affect the global environment, when finally disposed.

As the biodegradable polymer, expensive materials such as polybutylene adipate-co-terephthalate (PBAT) and poly(hydroxyalkanoates)(PHA) are main components, and particularly, the PBAT series has functional and economic problems for commercial use due to the low distribution stability and high prices. Further, it may be an alternative to use a polylactic acid (PLA) series which is the most inexpensive among biodegradable resins in order to secure price competitiveness, but when the polylactic acid series is applied to a molded product such as a film, there is a limitation in mechanical properties such as easy tearing of film due to the inherent brittleness of polylactic acid.

Recently, biodegradable polymers that simply decompose after use still require considerable time to decompose, and the reuse and regeneration of limited resources has become a hot issue, and thus the paradigm is shifting to bioplastics that overcome the disadvantages of biodegradable polymers.

In these bioplastics, the importance of innocuousness to the human body, physical properties, strength, productivity, price competitiveness, reuse, and renewability is more emphasized than the problems of how quickly the bioplastics decompose and whether the bioplastics enter the virtuous circle of nature.

Therefore, there is still a need for developing a bioplastic material which is simultaneously excellent in renewability while having the biodegradability of a biodegradable polymer in the related art.

SUMMARY OF THE INVENTION

The present invention has been made in an effort to provide a renewable resin composition which is biodegradable and simultaneously excellent in renewability through reprocessing.

The present invention has also been made in an effort to provide a product prepared by the composition.

To solve these problems, according to an aspect of the present invention, the following exemplary embodiments are provided.

According to a first exemplary embodiment, provided is a renewable resin composition including 100 parts by weight of cassava starch, 100 to 200 parts by weight of polybutylene succinate (PBS), 20 to 120 parts by weight of polybutylene adipate-co-terephthalate (PBAT), and 10 to 40 parts by weight of a plasticizer.

According to a second exemplary embodiment, in the first exemplary embodiment, the renewable resin composition may include 100 parts by weight of cassava starch, 120 to 180 parts by weight of polybutylene succinate, 40 to 100 parts by weight of polybutylene adipate-co-terephthalate, and 15 to 35 parts by weight of a plasticizer.

According to a third exemplary embodiment, in the first exemplary embodiment or the second exemplary embodiment, the plasticizer may include a polyhydric alcohol, a sugar alcohol, an anhydride of a sugar alcohol, a urea-based compound, a protein, an acid ester, an aliphatic acid polymer, or two or more thereof.

According to a fourth exemplary embodiment, in any one exemplary embodiment of the first to third exemplary embodiments, the renewable resin composition may further include an impact reinforcing agent.

According to a fifth exemplary embodiment, in any one exemplary embodiment of the first to fourth exemplary embodiments, the renewable resin composition may have a biocontent of 35 to 70% in accordance with ASTM D6866 standards.

According to a sixth exemplary embodiment, in any one exemplary embodiment of the first to fifth exemplary embodiments, the renewable resin composition may include 100 parts by weight of cassava starch, 120 to 180 parts by weight of polybutylene succinate, 40 to 100 parts by weight of polybutylene adipate-co-terephthalate, and 15 to 35 parts by weight of glycerin oil and have a biocontent of 35 to 70% in accordance with ASTM D6866 standards, and the renewable resin composition may be easily mass-produced while having price competitiveness because the cassava starch is used by replacing potato starch or corn starch, be composted, and have a low amount of carbon dioxide emission.

According to an aspect of the present invention, a product of the following exemplary embodiments is provided.

According to a seventh exemplary embodiment, provided is a product prepared from the renewable resin composition of any one exemplary embodiment of the first to sixth exemplary embodiments.

According to an eighth exemplary embodiment, in the seventh exemplary embodiment, the product may be a film, an envelope, a straw, a container, or a tray.

According to an exemplary embodiment of the present invention, by using a low content of polybutylene adipate-co-terephthalate usually used as a biodegradable polymer in the related art while using cassava starch having a high biocontent as a main material, it is possible to provide a renewable resin composition which is biodegradable and simultaneously excellent in renewability through reprocessing.

The renewable resin composition according to an exemplary embodiment of the present invention is advantageous because the renewable resin composition can be mass-produced while having price competitiveness by replacing expensive potato starch or corn starch used in the related art and using cassava starch, be biodegraded and composted, and have a low amount of carbon dioxide emission.

The renewable resin composition according to an exemplary embodiment of the present invention is relatively soft, has high elasticity and viscosity due to the high viscosity thereof, and has an effect of reducing the boiling time due to the low gelatinization temperature thereof. Since the renewable resin composition according to an exemplary embodiment of the present invention has higher swelling power than that of sticky corn starch in the related art, the renewable resin composition has high absorption force, high transparency, and low aging properties.

DETAILED DESCRIPTION

Hereinafter, the present invention will be described in detail. Prior to the description, terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Accordingly, since the configurations illustrated in the examples described in the present specification are only the most preferred exemplary embodiment of the present invention and do not represent all of the technical spirit of the present invention, it is to be understood that various equivalents and modified examples, which may replace the configurations, are possible at the time of filing the present application.

In the related art, "biodegradable resin" suggested to solve problems of a general plastic material which causes environmental problems refers to a polymer in which a resin such as a polymer or plastic can be chemically decomposed in the environment such as soil after being used, and thus releases natural byproducts such as carbon dioxide, nitrogen, water, biomass, and inorganic salts. A number of these biodegradable resins are being obtained from fossil fuels such as petroleum, and these fossil fuels are resources that are not renewable, and also have a limitation in environmental friendliness because the amount of carbon generated during the process is high.

Conversely, "renewable resin" according to an aspect of the present invention refers to a resin in which all or a portion of a product and a byproduct collected after being used or discarded without being used can be used again as a raw material. In this case, it can be said that as the higher degree to which the resin used or discarded may be used again as a raw material is, the higher the renewability is.

The renewability may be evaluated as a "biocontent", and the biocontent may refer to a polymer or composition containing a polymer at least partially derived from a biologically-based molecular unit. In this case, the "biocontent" may be determined by ASTM D6866 (standard test method for measuring a biobased material of solid, liquid, and gaseous samples using radioactive carbon), and may be referred to as a mass percent of the amount of carbon from renewable resources (amount of biological carbon) compared to the total organic carbon in a material.

Specifically, in accordance with ASTM D6866 standards, the biocontent may be determined by measuring the content of carbon (C14) having a mass number of 14 and the contents of carbon (C12) having a mass number of 12 and carbon (C13) having a mass number of 13 in a material to obtain the content ratio of carbon (C14) having a mass number of 14.

The biocontent means that as the content ratio of carbon (C14) having a mass number of 14 in the total carbon content of a material is increased, the amount of carbon dioxide emission may be decreased according to the carbon neutral concept when the material is burnt. When a material is composed of only petroleum-derived raw materials, carbon having a mass number of 14 is not observed. In order to obtain the effect of reducing the amount of carbon dioxide emission, the higher concentration value of C14 may be preferred.

In this case, the biocontent (%) may be calculated by the following equation.

Biocontent (%)=[content of biological (organic) carbon in a material (content of C14)]/[content of total (organic) carbon in a material (total amount of C12+C13+C14)]*100%

The biologically-based unit may be a biologically-derived monomer. The biologically-based monomer may be derived from a plant, for example. The plant may be any plant, such as a starch-based plant, castor bean, palm oil, vegetable oil, sugar cane, corn, rice, switch grass, and the like.

These renewable resins may not all have biodegradable properties. Meanwhile, "renewable resin" is a concept that is differentiated from reusable in which used products are reused as they are or after being repaired, or reused in production activities.

The renewable resin composition according to an aspect of the present invention includes 100 parts by weight of cassava starch, 50 to 100 parts by weight of polybutylene succinate (PBS), 75 to 95 parts by weight of polybutylene adipate-co-terephthalate (PBAT), and 1 to 20 parts by weight of a plasticizer.

The cassava starch refers to starch collected from cassava, and the cassava is a plant native to South America, and is a root vegetable in which the roots of the lump are stretched in all directions and thick, like a sweet potato, with a brown surface and a white core. Cassava is cultivated actively in the tropics, cultivation is very simple and increased by cuttings, and potatoes (roots and stems) can be harvested, and thus double cropping is also possible. Cassava is rich in calcium and vitamin C and contains 20 to 25% starch.

Cassava starch is produced by squashing cassava and washing the starch with water to precipitate, and then drying the precipitate.

Cassava is used in various applications, such as alcohol, bioethanol, feed, papermaking, and food. Although cassava is native to South America, cassava is produced mainly in Africa and Southeast Asia, with production increasing particularly in Southeast Asia.

In the food industry, the demand for replacing potato starch, corn starch, and sweet potato starch tends to be increasing. Many countries in the world have been interested in cassava in response to an increase in feed prices and the like caused by climate change, an increase in demand for bioethanol, and an increase in international grain prices. International prices for corn, wheat, soybean, and the like are now constantly increasing every day. Under the circumstances, cassava starch is advantageous because cassava starch is price competitive compared to corn starch or potato starch used in the related art, can be easily mass-produced, can be completely biodegraded and composted, and has a low amount of carbon dioxide emission.

The cassava starch has disadvantages of high water solubility and weak mechanical strength as compared to traditional synthetic plastics.

In order to reduce water absorption characteristics of this cassava starch and improve mechanical characteristics of this cassava starch, polybutylene succinate and polybutylene adipate-co-terephthalate are blended along with cassava starch in the renewable resin composition of the present invention.

The polybutylene succinate is excellent in processability due to the relatively high melting point and has been developed as an alternative material for a non-biodegradable polymer synthetic resin due to the excellent biodegradability. The polybutylene succinate is a polyester-based thermoplastic polymer resin, a biodegradable aliphatic polyester having characteristics comparable to polypropylene, and a biodegradable and semi-crystalline thermoplastic resin. The polybutylene succinate may be produced as a renewable feed raw material such as glucose and sucrose through fermentation or a petroleum-based resin raw material. Since mechanical characteristics of the polybutylene succinate may be compared with characteristics of high-density polyethylene and isotactic polypropylene widely used, the polybutylene succinate is a very promising biopolymer. The polybutylene succinate is much more flexible than the PLA, and thus does not need a plasticizer, but has a lower melting point than the PLA (115° C. vs about 160° C.). The polybutylene succinate is one of the latest biopolymers and may be a cost-efficient alternative to other biopolymers such as PLA, PBAT, and PHB. Examples of an application field thereof include food packaging, a mulching film, a flowerpot, a sanitary ware, a fishing net, and a fishing line, and further, the polybutylene succinate may be used as a matrix polymer or in combination with other biopolymers such as polylactic acid (PLA).

The polybutylene succinate is a partially biodegradable biosource, may easily interact with starch in order to make a homogeneous compound, and has excellent mechanical and physical characteristics capable of replacing existing home plastic products.

For example, the polybutylene succinate may be obtained by a polycondensation reaction of 1,4-butanediol with dicarboxylic acid or an acid anhydride thereof, for example, succinic acid. A polybutylene succinate polymer may be a linear polymer or a long-chain branched polymer. A long-chain branched polybutylene succinate polymer may be prepared using an additional polyfunctional component selected from the group consisting of a trifunctional or tetrafunctional polyol, oxycarboxylic acid, and a polybasic carboxylic acid. A polybutylene succinate polymer is publicly known in the related technical field.

The polybutylene succinate may be included in an amount of 100 to 200 parts by weight, and, according to an exemplary embodiment of the present invention, 120 to 180 parts by weight, or 130 to 165 parts by weight, based on 100 parts by weight of cassava starch.

When the content of the polybutylene succinate satisfies the aforementioned range, the biocontent of the renewable resin composition may be increased.

The poly(butylene adipate-co-terephthalate) (PBAT) refers to a polymer including a random copolymer of butylene adipate and terephthalate. The poly(butylene adipate-co-terephthalate) that is suitable for the composition according to an exemplary embodiment of the present invention may be prepared by any method publicly known in the latest technology. For example, poly(butylene adipate-co-terephthalate) may be prepared by polycondensation of 1,4-butadiene with a mixture of adipic acid and terephthalic acid.

The poly(butylene adipate-co-terephthalate) may be used in mixture with the PLA in order to produce a biodegradable packaging plastic product, and has excellent tensile property characteristics. The poly(butylene adipate-co-terephthalate) may be easily molded and thermoformed into a semi-aromatic, biodegradable thermoplastic copolyester. The poly(butylene adipate-co-terephthalate) is produced by random copolymerization of 1,4-butanediol, adipic acid, and a dimethyl terephthalate (DMT) monomer. The poly(butylene adipate-co-terephthalate) has many useful attributes similar to polyethylene. For example, the poly(butylene adipate-co-terephthalate) has relatively high elongation at break (30 to 40%) as well as moderate high impact and puncture toughness, and may have slightly low tensile strength and strength. Accordingly, the poly(butylene adipate-co-terephthalate) is very similar to polyethylene, and thus, may be used in a similar application field in the application fields of food packaging and an agricultural film, is also biodegradable (can be composted), and may be treated in an existing blown film device used for polyethylene. The poly(butylene adipate-co-terephthalate) may be used as a reinforcing agent for poly(lactic acid) A, is a partially renewable biosource, may easily interact with starch in order to make a homogeneous compound, and has excellent mechanical and physical characteristics capable of replacing an existing home plastic product.

The polybutylene adipate-co-terephthalate may be included in an amount of 20 to 120 parts by weight, or 40 to 100 parts by weight, or 50 to 80 parts by weight, based on 100 parts by weight of cassava starch.

When the content of the polybutylene adipate-co-terephthalate satisfies the aforementioned range, the biocontent of the renewable resin composition may be increased.

The plasticizer is added to a polymer of cassava starch, polybutylene succinate, and polybutylene adipate-co-terephthalate to increase flexibility, elasticity, and bendability, thereby improving processability, moldability, and the like. Cassava starch and the like are not easily deformed due to the high molecular weight, but when plasticity is imparted to cassava starch and the like, cassava starch and the like may be easily deformed by external force.

The content of the plasticizer may be 10 to 40 parts by weight, or 15 to 35 parts by weight or 20 to 30 parts by weight, based on 100 parts by weight of cassava starch.

When the content of the plasticizer is less than 1 part by weight based on 100 parts by weight of cassava starch, there is concern that the effect of improving physical properties may be insignificant, and when the content thereof is more than 20 parts by weight, the plasticizer included in an excessive amount may migrate from the renewable resin composition to the surface of a product after the product is prepared, and in this case, there may occur a problem in that as the sealing strength is gradually weakened, the quality of a finally prepared product such as a shopping bag deteriorates.

Examples of the plasticizer include polyhydric alcohol plasticizers, for example, sugars (for example: glucose, sucrose, fructose, raffinose, maltodextrose, galactose, xylose, maltose, lactose, mannose, and erythrose), sugar alcohols (for example: erythritol, xylitol, malitol, mannitol, and sorbitol), polyols (for example: ethylene glycol, glycerol, propylene glycol, dipropylene glycol, butylene glycol, and hexane triol) and the like, hydrogen bond forming organic compounds which do not have a hydroxyl group, for example, urea-based compounds (urea and urea derivatives); anhydrides of sugar alcohols such as sorbitan; animal proteins such as gelatin; vegetable proteins such as sunflower proteins, soybean proteins, cotton seed proteins; and proteins which are mixtures thereof. In addition, examples of the plasticizer include phthalate esters, dimethyl and diethylsuccinate and related esters, glycerol triacetate, glycerol mono and diacetates, glycerol mono, di, and tripropionates, butanoates, stearates, and acid esters such as lactic acid esters, citric acid esters, adipic acid esters, stearic acid esters, oleic acid esters, and other acid esters. An aliphatic acid polymer may be used as the plasticizer, and examples thereof include a copolymer of ethylene and acrylic acid, polyethylene grafted with maleic acid, a polybutadiene-acrylic acid copolymer, a polybutadiene-maleic acid copolymer, a polypropylene-acrylic acid copolymer, a polypropylene-maleic acid copolymer, and other hydrocarbon-based acids. A plasticizer having a low molecular weight, for example, a low molecular weight less than about 20,000 g/mol, preferably less than about 5,000 g/mol, and more preferably less than about 1,000 g/mol is preferred.

According to an exemplary embodiment of the present invention, the renewable resin composition may include 100 parts by weight of cassava starch, 120 to 180 parts by weight of polybutylene succinate, 40 to 100 parts by weight of polybutylene adipate-co-terephthalate, and 15 to 35 parts by weight of a plasticizer.

The renewable resin composition according to an exemplary embodiment of the present invention may further include an impact reinforcing agent.

The content of the impact reinforcing agent may be 0.1 to 5 parts by weight, or 0.1 to 3.5 parts by weight, based on 100 parts by weight of the resin mixture of the cassava starch, the polybutylene succinate, and the polybutylene adipate-co-terephthalate. When the content of the impact reinforcing agent satisfies the aforementioned range, the tearing strength and mechanical strength of a renewable product may be improved.

The impact reinforcing agent may include one or more selected from the group consisting of an ethylene-octene copolymer grafted with polybutadiene, a methyl methacrylate-butadiene-styrene (MBS) terpolymer, an acrylic copolymer, and an ethylene acrylate copolymer, and preferably, it is possible to use an MBS terpolymer in which a butadiene-styrene copolymer forms a core and methyl methacrylate is grafted on the surface of the core to form a shell.

Specifically, in the case of the core-shell type MBS terpolymer, the core part is composed of styrene-butadiene crosslinked rubber, which is effective for absorbing impact, and the shell part is composed of methyl methacrylate, and which is effective for enhancing the dispersibility of an impact reinforcing agent by improving the kneadability with a substrate. Accordingly, when an MBS terpolymer is used as an impact reinforcing agent, the impact reinforcing agent may be uniformly dispersed in a biodegradable resin, and the excellent dispersibility may improve impact efficiency and surface properties, which is more preferred.

For example, as the MBS terpolymer, it is possible to use MB885, MB872, or MB802 manufactured by LG Chem., METABLEN® Series manufactured by Mitsubishi Rayon Co., Ltd., and the like. As the acrylic copolymer, Paraloid® Series manufactured by Dow Chemical Company), for example, Paraloid® BPM-520, and the like may be used, and as the ethylene acrylate copolymer, BIOMAX® Strong Series manufactured by DuPont Company, for example, BIOMAX® Strong 120, and the like may be used.

In addition, the renewable resin composition according to an exemplary embodiment of the present invention may further include various additives such as a compatibilizer, a surfactant, an antioxidant, and a coupling agent either alone or in a mixture of two or more thereof, according to the use purpose.

The renewable resin composition according to an exemplary embodiment of the present invention may have a biocontent of 35 to 70% or 38.5 to 50%. In this case, as described above, the biocontent may be determined by ASTM D6866 (standard test method for measuring a biobased material of solid, liquid, and gaseous samples using radioactive carbon), and may be referred to as a mass percent of the amount of carbon from renewable resources (amount of biological carbon) compared to the total organic carbon in a material. In this case, the biocontent (%) may be calculated by the following equation.

$$\text{Biocontent (\%)} = [\text{content of biological (organic) carbon in a material (content of C14)}] / [\text{content of total (organic) carbon in the material (total amount of C12+C13+C14)}] * 100\%.$$

According to an aspect of the present invention, provided is a product prepared from the above-described renewable resin composition.

The renewable resin composition according to an aspect of the present invention may be formed into a film using, for example, an inflation method or a T-die method. Further, the surface of a paper product or the like may also be coated with the renewable resin composition according to an aspect of the present invention.

The resin composition may be processed by an injection molding machine, a vacuum molding machine, an extruder, a blow molding machine, and the like. For example, the resin composition may be processed for a seedling-raising flowerpot (pot), a pile, a pipe, a wall material, a plate product, an engineering plastic product, a packaging material, an agricultural and fishery product, a daily product, a construction material, and the like.

These products may be used for materials and parts and the like for automobile parts, civil engineering, medical use, sports use, and tree-planting.

Specifically, for example, it is possible to mold the renewable resin composition of the present invention to prepare various plastic products such as a straw, a container (a container for synthetic detergent, a drug container, a food tray, a microwave food container, an insect repellent container, a tray for soap, a lunch box, and a confectionery/candy container), golf goods, a cut blade of wrap aluminum foil, an envelope (a cultivation envelope, a flower cultivation envelope, a garbage envelope, and the like), an industrial tray, a confectionery partitioning member, and a special package.

Hereinafter, the present invention will be described in detail with reference to Examples to help understanding of the present invention. However, the Examples according to the present invention may be modified in various forms, and it should not be interpreted that the scope of the present invention is limited to the following Examples. The Examples of the present invention are provided for more completely explaining the present invention to the person with ordinary skill in the art.

Example 1

A pre-resin mixture was prepared by introducing 40 parts by weight of polybutylene succinate (PTT MCC Biochem Co., Ltd), and 20 parts by weight of polybutylene adipate-co-terephthalate (BASF, product name Ecoflex) into a mixer.

Subsequently, the pre-resin mixture was introduced into a No. 1 main feeder of a twin-screw extruder (a product manufactured by Changsung P&R, L/D: 48/1, diameter: 1.5 mm), 27.3 parts by weight of cassava starch was introduced into a No. 2 feeder, and 7.7 parts by weight of glycerin oil as a plasticizer and 5 parts by weight of a coupling agent (a silane coupling agent: vinyltrimethoxysilane) were introduced into a side liquid feeder.

The resin composition materials introduced from the feeders were compounded and extruded by the extruder, and subsequently, cooled in a water bath at 40° C., and then dried by a dryer.

A renewable resin composition in a pellet form was prepared by cutting the dried extrusion product into a pellet of 2.4 to 2.5 mm through a pelletizing machine.

Example 2

A renewable resin composition was prepared in a pellet form in the same manner as in Example 1, except that after cassava starch was introduced, 3 parts by weight of an elastomer (an ethylene-octene copolymer grafted with polybutadiene) was further introduced as an impact reinforcing agent.

Comparative Example 1

A renewable resin composition was prepared in a pellet form in the same manner as in Example 1, except that cassava starch was not introduced.

Experimental Example: Evaluation of Biocontent

The biocontents were measured in accordance with ASTM D6866 using the renewable resin compositions prepared in Examples 1 and 2 and Comparative Example 1.

In this case, the biocontent (%) was calculated by the following Equation.

Biocontent (%)=[content of biological (organic) carbon in a material (content of C14)]/[content of total (organic) carbon in the material (total amount of C12+C13+C14)]*100%.

The results are shown in the following Table 1.

TABLE 1

|  | Biocontent (%) |
| --- | --- |
| Example 1 | 40.0 |
| Example 2 | 38.5 |
| Comparative Example 1 | 17.5 |

Referring to Table 1, it could be seen that the renewable resin compositions of Examples 1 and 2 according to an exemplary embodiment of the present invention exhibited remarkably higher biocontent values than that of Comparative Example 1.

What is claimed is:

1. A renewable resin composition comprising 100 parts by weight of cassava starch, 100 to 200 parts by weight of polybutylene succinate (PBS), 20 to 120 parts by weight of polybutylene adipate-co-terephthalate (PBAT), and 10 to 40 parts by weight of a plasticizer.

2. The renewable resin composition of claim 1, wherein the renewable resin composition comprises 100 parts by weight of cassava starch, 120 to 180 parts by weight of polybutylene succinate, 40 to 100 parts by weight of polybutylene adipate-co-terephthalate, and 15 to 35 parts by weight of a plasticizer.

3. The renewable resin composition of claim 1, wherein the plasticizer comprises a polyhydric alcohol, a sugar alcohol, an anhydride of a sugar alcohol, a urea-based compound, a protein, an acid ester, an aliphatic acid polymer, or two or more thereof.

4. The renewable resin composition of claim 1, further comprising an impact reinforcing agent.

5. The renewable resin composition of claim 1, wherein the renewable resin composition has a biocontent of 35 to 70% in accordance with ASTM D6866 standards.

6. The renewable resin composition of claim 1, wherein the renewable resin composition comprises 100 parts by weight of cassava starch, 120 to 180 parts by weight of polybutylene succinate, 40 to 100 parts by weight of polybutylene adipate-co-terephthalate, and 15 to 35 parts by weight of glycerin oil and has a biocontent of 35 to 70% in accordance with ASTM D6866 standards, is able to be easily mass-produced while having price competitiveness because the cassava starch is used by replacing potato starch or corn starch, is able to be composted, and has a low amount of carbon dioxide emission.

7. A product prepared from the renewable resin composition of claim 1.

8. The product of claim 7, wherein the product is a film, an envelope, a straw, a container, or a tray.

* * * * *